Nov. 15, 1949     R. L. BENSON ET AL     2,488,161
AUTOMATIC CONTROL MEANS FOR REFRIGERATING SYSTEMS
Filed Aug. 30, 1945
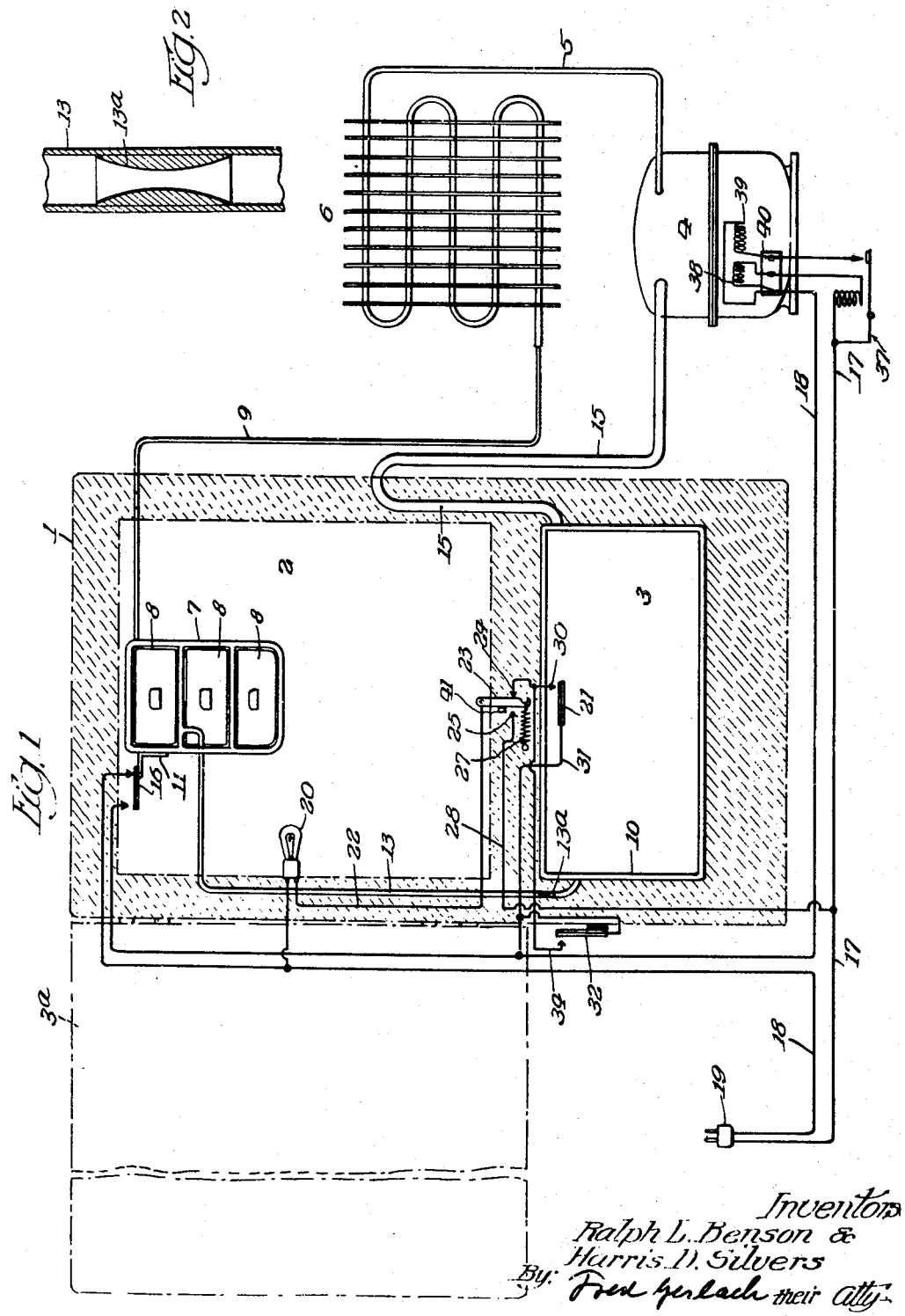
Inventors
Ralph L. Benson &
Harris D. Silvers
By: Fred Gerlach their Atty.

Patented Nov. 15, 1949

2,488,161

UNITED STATES PATENT OFFICE 2,488,161

AUTOMATIC CONTROL MEANS FOR REFRIGERATING SYSTEMS

Ralph L. Benson, Birmingham, and Harris D. Silvers, Detroit, Mich., assignors to Avco Manufacturing Corporation, a corporation of Delaware Application August 30, 1945, Serial No. 613,520

13 Claims. (Cl. 62—4)

1

The invention relates to means for controlling refrigerating systems which include a cooling compartment for foods or products to be maintained at a predetermined temperature above freezing and a compartment in which products are to be preserved at below-freezing temperature.

In refrigerating systems of this type, it is advantageous to circulate the refrigerant successively through an evaporator in the cooling compartment and an evaporator in the freezing compartment for producing differential temperatures in said compartments and to normally control the operation of the compressor unit thermostatically by the temperature in the cooling compartment.

One object of the invention is to provide improved means for controlling the refrigeration to maintain the desired freezing temperature in the freezing compartment when the ambient temperatures are such as to require no or insufficient refrigeration in the cooling compartment for maintaining the freezing temperature in the freezing compartment.

Another object of the invention is to provide simple and efficient means for controlling a refrigerating system of the aforesaid two-compartment type to prevent freezing temperatures in the cooling compartment in which freezing temperatures are not desired.

Another object of the invention is to provide improved efficient and simple means for controlling the refrigerating system to maintain the desired differential temperatures in the cooling and freezing compartments under wide differences of ambient temperatures.

Another object of the invention is to provide control means for a refrigerating system of the aforesaid type in which the lamp used for illuminating the cooling compartment, when its door is opened for access to the contents thereof, is utilized to heat the cooling compartment for use in controlling the operation of the compressor by a thermostat in said cooling compartment.

Other objects of the invention will appear from the detailed description.

The invention consists in the several features hereinafter set forth and more particularly defined by claims at the conclusion hereof.

In the drawings:

Fig. 1 is a diagrammatic view of a refrigerating system embodying the invention.

Fig. 2 is a section illustrating the restriction in the conduit between the evaporator in the cooling compartment and the evaporator in the freezing compartment.

2

The invention is exemplified with a refrigerating cabinet 1, illustrated in dotted lines, and includes a cooling compartment 2 and a separate frozen storage or freezing compartment 3. The cabinet is provided with walls for insulating the cabinet and insulating the compartments from each other, and a door 3ª for access to the cooling compartment 2 in the cabinet.

The refrigerating system comprises a unit 4 which includes an enclosed electric motor and a compressor for the refrigerant driven by the motor. This unit may be of any suitable construction, as well understood in the art, for compressing the circulating refrigerant through the system. The pressure or discharge side of the compressor is connected by a pipe 5 to a condenser 6. An evaporator 7 is disposed in the cooling compartment 2 and is communicatively connected by a capillary tube 9 to the discharge side of the condenser 6. Capillary tube 9 restricts and controls the flow of high pressure refrigerant from the condenser and delivers it at low pressure to evaporator 7. Evaporator 7 usually includes trays 8 for freezing ice cubes, as well understood in the art. Evaporator 7 provides the desired refrigeration for the cooling compartment 2. An evaporator 10 defines the freezing compartment 3 and provides refrigeration for said compartment. A tube 13, which may be of any suitable diameter to restrict or provided with a restrictor 13ª as shown, delivers refrigerant from the discharge side of evaporator 7 at one pressure and to evaporator 10 at a lower pressure. From evaporator 10 the refrigerant returns through a pipe 15 to the suction side of the compressor unit 4. The unit 4 with its associated condenser 6 is usually referred to as a condensing unit since it receives low pressure refrigerant in vapor phase and by means of the compressing of the vapor and the cooling thereof places the refrigerant in liquid phase.

Current for the operation of the electric motor for operating the compressor to compress and circulate the refrigerant is supplied to said motor by line-conductors 17 and 18 which are connected to a plug 19 which is adapted to be connected to any source of electric current. A thermostatic switch 16 is included in line-conductor 18 and located on a bracket 11 in heat exchange relationship with evaporator 7 where it will be responsive to a temperature intermediate that in the cooling compartment 2 and that of the evaporator 7 for controlling the operation of the unit 4. The line-conductors 17 and 18 are connected to the terminals 40 of the usual starting winding 39 and main winding 38 of the motor. The thermostat of switch 16 is responsive to open and close said switch to maintain a temperature in said compartment of about 40° Fahr. If the temperature sensitive element is in more direct thermal contact with the evaporator 7, the actual temperature at which switch 16 opens and closes will be somewhat lower than if the element is spaced further away from the evaporator 7 and consequently more nearly responsive to the temperature of the cabinet air.

In refrigerating systems which include a cooling compartment and a freezing compartment, it is advantageous to maintain a suitable temperature, for example, 40° Fahr. in compartment 2 for cooling, without freezing, foods and beverages stored therein, and to maintain a suitable freezing temperature, for example, 6° to 8° Fahr. in the freezing compartment 3, for the preservation of foods in said compartment. Due to cost, it is desirable to effect the necessary refrigeration in both compartments by circulating the refrigerant successively through evaporator 7 in compartment 2 and evaporator 10 in compartment 3, so that only one condensing unit need be employed.

In the use of the refrigerator, it is sometimes placed in a heated room in which a normal temperature of about 70° Fahr. is maintained, and other times in an unheated room where the ambient temperature may be 60° Fahr. or less, or outside of a building, as on a porch, where the ambient temperature may fall below 40° Fahr. As the ambient temperatures vary, the cooling requirements of the compartments 2 and 3 vary with respect to each other and, therefore, a single thermostatic switch, placed in one of the compartments 2 or 3 for controlling resultant refrigeration produced by the unit 4, would not necessarily provide the desired degree of cooling in the compartment not containing the thermostatic switch.

When the refrigerator cabinet is placed in a room kept at a normal temperature, for example, 70° Fahr., the heat leakage into compartment 2 with respect to the surface area and temperature of evaporator 7 and the heat leakage into compartment 3 with respect to the surface area and temperature of evaporator 10 is balanced so that thermostatic switch 16 acting in response to the temperature in compartment 2 will be closed for periods of sufficient duration to operate unit 4 for circulating refrigerant and will maintain a temperature of about 40° Fahr. in the cooling compartment 2 and a temperature of about 6° to 8° Fahr. in the freezing compartment 3, at which temperatures the products in compartment 2 will not be frozen and the products in compartment 3 will be maintained in a frozen condition.

When the refrigerator cabinet is placed in an unheated room or outside of a building where ambient temperatures substantially below 60° Fahr. and even as low as 40° Fahr. may occur, the temperature or heat absorption in compartment 2 is insufficient to close the thermostatic switch 16 for periods of sufficient duration to provide the necessary refrigeration for maintaining the desired freezing temperature of about 6° to 8° Fahr. in the freezing compartment 3. When this occurs, the products in compartment 3 may thaw and spoil.

Should the ambient temperature be below 40° F. and above the desired temperature of compartment 3, then switch 16 would not close to actuate the compressor and the temperatures in compartments 2 and 3 would tend to become equal to each other and to the ambient temperature. If the ambient temperature becomes between 40° and 32° F., the temperature of compartment 2 would be satisfactory while the temperature of compartment 3 would rise above freezing and allow spoilage of the comestibles stored therein. If the ambient temperature be between 32° F. and the highest safe storage temperature of the comestibles in compartment 3, for example, 15° F., then neither the temperature of compartment 2 nor compartment 3 would be satisfactory as the comestibles in compartment 2 would freeze while those in compartment 3 would rise in temperature so high that even though frozen, they would not keep for the desired time without spoilage. If the ambient temperature be below the 15° F. example, the temperature of compartment 3 would be acceptable, but the temperature in compartment 2 would be so low as to freeze the comestibles stored therein.

The invention provides means for automatically controlling the refrigerating system to produce sufficient refrigeration in the freezing compartment 3 to prevent thawing or spoilage of the frozen products stored therein, as the result of the cabinet being placed where low ambient temperatures occur. This automatic control means includes generally, an electric lamp 20, which is disposed in the cooling compartment 2 to produce sufficient heat therein to raise the temperature sufficiently to cause thermostatic switch 16 to close the electric circuit for the operation of unit 4 and a thermostatic switch 21 which is disposed where it will be responsive to temperature in the freezing compartment 3. Thermostatic switch 21 is adapted to close a circuit through lamp 20 when the temperature in the freezing compartment rises sufficiently, for example, to 15° F., to endanger the thawing or spoilage of the frozen products in said compartment.

Usually electric lamp 20 is used to illuminate the cooling compartment 2 and is controlled by a switch which is operable by the door to said compartment so that the lamp will be actuated when the door is opened and automatically extinguished when the door is closed. The automatic control mechanism utilizes the heating properties of the same lamp for heating compartment 2. Lamp 20 is included in a conductor 22 which is connected to line-conductor 18, intermediate plug 19 and switch 16 and to a two-way door-operable switch 23. Switch 23, when the door to compartment 2 is open, will be shifted by a spring 27 to engage a contact 25 which is connected by a conductor 28 to line-conductor 17 so that when the door is opened, a circuit will be established from line-conductor 18, conductor 22 including lamp 20, switch 23, contact 25, conductor 28 and line-conductor 17 for illuminating the compartment 2 when said door is open. Switch 23, when the door is closed, engages a contact 24 which is connected to a contact 30 for the thermostatic switch 21. Switch 21 is connected by a conductor 31 to line-conductor 18, intermediate switch 16 and the compressor. When the door is closed, the thermostatic switch 21, upon a rise in temperature to about 15° Fahr. in the freezing compartment 3, will close a circuit for the operation of lamp 20, viz: line-conductor 18, conductor 22 in which said lamp is included, switch 23, contacts 24, 30, switch 21 and conductor 31. As a result of this actuation of lamp 20, heat will be supplied by said lamp to compartment 2 to raise the temperature therein sufficiently to cause the thermostatic switch 16 to close and cause the operation of unit 4 for circulating the refrigerant through evaporator 7 in the cooling compartment 2 and evaporator 10 in the freezing compartment 3 and lowering the temperature in said freezing compartment. Switch 16 and lamp 20 are in parallel arrangement so that upon closure of switch 16 the bulb or lamp 20 will be extinguished. The extinguishing of lamp 20 during the period the compressor of unit 4 is energized is particularly desirable in the event the temperature of compartment 3 increases above 15° Fahr. due to causes other than low ambient such as the inserting of a large quantity of warm comestibles therein, when starting operation of the unit after it has warmed up due to nonuse and other similar causes.

The invention also provides means for controlling the temperature for the purpose of preventing the products in the cooling compartment 2 from freezing, when the ambient temperature is lower than the temperature at which switch 21 will close and is, therefore, sufficiently low to cause such freezing. This means includes a second thermostatic switch 32 mounted outside cabinet 1, which is connected to conductor 31 and is engageable with a contact 35 which is connected by a conductor 34 with contact 24 of switch 23, for controlling the actuation of lamp 20. Thermostatic switch 32 is responsive to any drop in ambient temperature below 15° Fahr which temperature would normally result in a drop in temperature in the cooling compartment 2 to a temperature below the freezing point. When this drop in ambient temperature occurs, switch 32 will close the circuit for the actuation of lamp 20 to produce sufficient heat in compartment 2 to keep the temperature above freezing and provide an inflow of heat to compartment 2, which is comparable to the heat flow into compartment 2 which would occur were the refrigerator in a much higher ambient temperature.

The operation of the refrigerating system will be as follows: when the refrigerator cabinet is disposed in a room of normal temperature or in a heated room, with an ambient temperature of approximately 70° Fahr. or higher, the operation of unit 4 is controlled by thermostatic switch 16 responsive to a rise in temperature above the range desired in the cooling compartment 2. When the cabinet is so disposed, the heat absorption in cooling compartment 2 will be sufficient to cause said unit 4, under control of thermostatic switch 16, to operate the compressor in cycles of sufficient duration to circulate the refrigerant and maintain the temperature in said cooling compartment within cooling range and sufficient circulation of refrigerant through evaporator 10 to maintain the desired range of freezing temperature in compartment 3 to keep the products therein frozen.

When the refrigerator cabinet is disposed in an unheated room or on an outside porch where the ambient temperature may drop considerably below 60° Fahr. and sometimes below freezing temperature, the heat absorption in the cooling compartment 2, to which thermostatic switch 16 is responsive, may be insufficient to cause the operation of unit 4 to sufficiently circulate refrigerant through evaporator 10 to maintain the freezing range of temperature necessary in the freezing compartment 3. Under these conditions, the temperature in freezing compartment 3 may rise, for example, to 15° Fahr. The thermostatic switch 21, which is responsive to said temperature, will then close and establish the following circuit for the actuation of lamp 20 to produce heat for raising the temperature in the cooling compartment 2, viz: line-conductor 18, conductor 22 in which lamp 20 is included, switch 23, contacts 24, 30, thermostatic switch 21, conductor 31, line-conductor 18, the compressor motor main winding 38, and line-conductor 17. The heat produced by lamp 20 will approximate the heat leakage into compartment 2 normally obtained by the 70° ambient temperature and raise the temperature in cooling compartment 2 without increasing the temperature in the freezing compartment 3. When the temperature in compartment 2 is increased by such heat to about 40° F., thermostatic switch 16, which is responsive to such temperature, will short out lamp 20, and start the motor of unit 4 to cause the compressor to circulate the refrigerant through evaporators 7 and 10, thereby lowering the temperature of the freezing compartment 3 and compartment 2. If the temperature of compartment 3 has not been lowered sufficiently to open switch 21 by the time switch 16 opens, the lamp 20 will again go on and the cycle will be repeated until the temperature of compartment 3 is lowered to the desired freezing range (6° to 8° Fahr.), at which time thermostatic switch 21 will open.

When the ambient temperature is below that required to close switch 21, viz: 15° Fahr., a freezing temperature in cooling compartment 2 would result. Thermostatic switch 32 responsive to ambient temperature will be closed and the following circuit will be established for actuating the lamp 20 to raise the temperature in said compartment above freezing temperature, viz: line-conductor 18, conductor 22 in which lamp 20 is included, switch 23, contact 24, conductor 34, contact 35, switch 32, line-conductor 18, the main motor winding 38 and line-conductor 17. The actuation of lamp 20 will continue while the ambient temperature remains sufficiently low to produce freezing temperature in cooling compartment 2, except during the operating cycle of the motor of unit 4.

Line-conductor 18, in which thermostatic switch 16 is included and to which conductors 22 and 31 are respectively connected, is connected to one of the contacts of the usual main motor winding 38. The current through lamp 20 is so low that it will not actuate the motor or starting switch 37. Lamp 20 being in parallel arrangement with switch 16 will be extinguished upon the closing of said switch and the operation of the motor of unit 4. This removes the heat input of the lamp 20 when the unit 4 is running.

When the door to the cooling compartment 2 is open, the switch 23 will be shifted by the spring 27 to engage the contact 25 and establish a circuit through the lamp 20 for illuminating compartment 2 via line-conductor 18, conductor 22, switch 23, contact 25, conductor 28 and line-conductor 17. This circuit will remain closed while the door is open, either when the motor is running or idle.

The door (not shown) for compartment 2 may shift the switch 23 by any suitable means such, for example, as a cam abutment 41 on the door which holds switch 23 against contact 24 when the door is closed and when the door is opened will release said switch so that spring 27 will shift it into engagement with contact 25.

The invention exemplifies means for controlling the temperature in a refrigerator provided with cooling and freezing compartments to maintain differential temperatures for cooling and freezing products stored in said compartments, respectively, which is adapted to control the operation of the compressor to maintain the freezing temperature in the freezing compartment when the ambient temperature is so low that the thermostat for controlling the operation of unit 4 responsively to the temperature in the cooling compartment is so low that no refrigeration of the cooling compartment is required. The invention also exemplifies means for maintaining a sufficiently high temperature in the cooling compartment to prevent freezing of the products therein when the ambient temperature is sufficiently low to cause such freezing. The invention also exemplifies means for supplying heat to the cooling compartment to prevent an undesirably low temperature therein, in which the lamp ordinarily used for illuminating said compartment is utilized. The invention also exemplifies control mechanism for this purpose which is simple in construction and efficient in operation.

The invention is not to be understood as limited to the details described, since these may be modified within the scope of the appended claims without departing from the spirit and scope of the invention.

Having thus described the invention, what we claim as new and desire to secure by Letters Patent is:

1. The combination with a refrigerating system which includes a cooling compartment, a freezing compartment, evaporators in the compartments, respectively, a motor and compressor driven thereby for circulating refrigerant, means for successively conducting refrigerant through evaporators for producing cooling and freezing temperatures in said compartments, respectively, an electric circuit for the motor, and thermostatic means responsive to the temperature in the cooling compartment for controlling the circuit for the motor; of an electric lamp for heating the cooling compartment to raise the temperature therein, and a circuit for the lamp including thermostatic means responsive to temperature in the freezing compartment, for controlling the actuation of the heating means to raise the temperature in the cooling compartment for the operation of the compressor when the temperature in the freezing compartment rises above a predetermined point, said last named circuit being connected to the motor circuit to cut off current to the heating means when the motor is running.

2. The combination with a refrigerating cabinet which includes a cooling compartment provided with a door and a freezing compartment, a motor and compressor driven thereby, evaporators in the compartments, respectively, means for successively circulating refrigerant through the evaporators for producing cooling and freezing temperatures therein, respectively, and thermostatic means responsive to temperature in the cooling compartment for controlling the operation of the compressor; of an electric lamp for heating and illuminating the cooling compartment; an electric circuit for the lamp including a door-operable two-way switch connected to the circuit for the lamp, for closing said circuit when the door is open, and a thermostatic switch responsive to temperature in the freezing compartment, connected to said switch and for closing the lamp-circuit when the door is closed.

3. The combination with a refrigerating cabinet which includes a cooling compartment provided with a door and a freezing compartment, a motor and compressor driven thereby, evaporators in the compartments, respectively, means for successively circulating refrigerant through the evaporators for producing cooling and freezing temperatures therein, respectively, and thermostatic means responsive to temperature in the cooling compartment for controlling the operation of the compressor; of an electric lamp for heating and illuminating the cooling compartment; an electric circuit for the lamp including a door-operable two-way switch, including a pair of contacts for closing the circuit through the lamp, one of which is engaged when the door is opened and a thermostatic switch responsive to temperature in the freezing compartment, connected to the other of said contacts for closing the lamp-circuit when the door is closed.

4. The combination with a refrigerating system which includes a cooling compartment, a freezing compartment, evaporators in the compartments, respectively, a motor and a compressor driven thereby for circulating refrigerant, means for successively conducting refrigerant through evaporators for producing cooling and freezing temperatures in said compartments, respectively, and thermostatic means responsive to the temperature in the cooling compartment for controlling the operation of the motor; of means for heating the cooling compartment to raise the temperature therein, thermostatic means responsive to temperature in the freezing compartment, for controlling the actuation of the heating-means to raise the temperature in the cooling compartment, for operating the compressor when the temperature in the freezing compartment rises above a predetermined point, and a second thermostatic means for energizing of the heating-means whereby the temperature in the cooling compartment is maintained above 32° Fahr.

5. A refrigerating system comprising a cooling compartment, a freezing compartment, evaporators in each of the compartments, a refrigerant liquifying means, conduit means interconnecting said liquifying means with said evaporators to provide for flow of refrigerant from said liquifying means to said evaporators and back to said liquifying means, thermostatic means disposed in said cooling compartment and normally operable to control said liquifying means to maintain a predetermined temperature in said cooling compartment, heating means in said cooling compartment, and thermostatic means responsive to the temperature of said freezing compartment for controlling said heating means and operable to energize said heating means at a predetermined maximum temperature of said freezing compartment, said first-named thermostatic means being so constructed and being arranged relative to said heating means, to de-energize said heating means upon actuation of said liquifying means to cool said cooling compartment.

6. A refrigerating system comprising a cooling compartment, a freezing compartment, evaporators in each of the compartments, a refrigerant liquifying means, conduit means interconnecting said liquifying means with said evaporators to provide for flow of refrigerant from said liquifying means to said evaporators and back to said liquifying means, thermostatic means disposed in said cooling compartment and normally operable to control said liquifying means to maintain a predetermined temperature in said cooling compartment, heating means in said cooling compartment, thermostatic means responsive to the temperature of said freezing compartment for controlling said heating means and operable to energize said heating means at a predetermined maximum temperature of said freezing compartment, and thermostatic means responsive to ambient temperature and operable to actuate said heating means at a predetermined minimum temperature below said predetermined maximum temperature.

7. A refrigerating system comprising a freezing compartment, a cooling compartment, evaporator means for cooling said freezing compartment to a first temperature and for cooling said cooling compartment to a second temperature higher than said first temperature, a condensing unit operated by an electric motor, conduit means interconnecting said evaporator means and said condensing unit for the circulation of a refrigerant therethrough, thermostatic switch means operable to open and close an electric circuit to said motor and operable to actuate said motor to maintain said cooling compartment within a desired temperature range, electric heating means for said cooling compartment, electric circuit means connecting said heating means in series with said motor, and thermostatic means controlling said circuit means and sensitive to the temperature of said freezing compartment, said last-named switch means being operable at a predetermined maximum temperature of said freezing compartment to close said circuit means.

8. A refrigerating system comprising a freezing compartment, a cooling compartment, evaporator means for cooling said freezing compartment to a first temperature and for cooling said cooling compartment to a second temperature higher than said first temperature, a condensing unit operated by an electric motor, conduit means interconnecting said evaporator means and said condensing unit for circulation of a refrigerant therethrough, thermostatic switch means operable to open and close an electric circuit to said motor and operable to actuate said motor to maintain said cooling compartment within a desired temperature range, electric heating means for said cooling compartment, electric circuit means connecting said heating means in series with said motor and thermostatic switch means controlling said circuit means and sensitive to the temperature of said freezing compartment, said last named switch means being operable at a predetermined maximum temperature of said freezing compartment to close said circuit means, said last-named switch means and said electric heating means being in series circuit with each other and being in parallel circuit with said first-named switch means.

9. A refrigerating system comprising a freezing compartment, a cooling compartment, evaporator means for cooling said freezing compartment to a first temperature and for cooling said cooling compartment to a second temperature higher than said first temperature, a condensing unit operated by an electric motor, conduit means interconnecting said evaporator means and said condensing unit for the circulation of a refrigerant therethrough, thermostatic switch means operable to open and close an electric circuit to said motor and operable to actuate said motor to maintain said cooling compartment within a desired temperature range, electric heating means for said cooling compartment, electric circuit means connecting said heating means in series with said motor and thermostatic switch means controlling said circuit means and sensitive to the temperature of said freezing compartment, said last named switch means being operable at a predetermined maximum temperature of said freezing compartment to close said circuit means.

10. A refrigerating system comprising a cooling compartment, evaporator means for cooling said compartment, a condensing unit actuated by an electric motor, conduit means interconnecting said evaporator means and said condensing unit for flow of refrigerant, an electric circuit for said motor, temperature sensitive switch means operable to energize and de-energize said circuit to maintain the temperature of said compartment below a predetermined maximum, an electric lamp located in said compartment, a door for said compartment, switch means operated by said door and operable upon opening of said door to close an electric circuit to said lamp, a third electric circuit, said last-named switch means being operable upon closing of said door to connect said lamp circuit to said third electric circuit, and a thermostatic switch means in said third circuit operable upon decrease in the ambient temperature to close said third circuit, said first-named switch means and said third circuit being in parallel circuit.

11. The combination with a refrigerating system which includes a cooling compartment, a freezing compartment, evaporators in the compartments, respectively, a motor and a compressor driven thereby for circulating refrigerant, means for successively conducting refrigerant through said evaporators for producing cooling and freezing temperatures in said compartments, respectively, thermostatic means responsive to the temperature in the cooling compartment for controlling the operation of said motor; of an electric lamp operable both to illuminate and heat said cooling compartment, a door for said cooling compartment, an electric circuit including a switch operable upon opening of said door to energize said lamp whereby said compartment is illuminated, and a thermostatic switch responsive to temperature in the freezing compartment for energizing said lamp upon a rise in temperature in the freezing compartment above a predetermined temperature.

12. The combination in a refrigerator cabinet having a refrigerating system which includes a cooling compartment, a freezing compartment, evaporators in the compartments, respectively, a motor and a compressor driven thereby for circulating refrigerant, means for successively conducting refrigerant through said evaporators for producing cooling and freezing temperature in said compartments, respectively, and thermostatic means responsive to the temperature in the cooling compartment for controlling the operation of the motor; of a lamp for illuminating and heating said cooling compartment, a door for closing said cooling compartment, switch means operable upon opening of said door for energizing said lamp to illuminate said cooling compartment, and a thermostatic switch responsive to ambient temperature external of said refrigerator cabinet for controlling the energization of said lamp whereby the temperature in said cooling compartment is maintained above a predetermined temperature.

13. A refrigerating system for a refrigerator cabinet having a cooling compartment normally maintained above 32° F. including an evaporator for cooling said first-mentioned compartment, a condensing unit actuated by an electric motor, conduit means interconnecting said evaporator and said condensing unit for flow of refrigerant, an electric circuit for said motor, a temperature sensitive switch operable in response to variation in temperature in said cooling compartment for energizing and deenergizing said motor, an electric lamp for heating said compartment, and thermostatic means responsive to the ambient temperature external of said cabinet operable to energize said lamp at a predetermined minimum ambient temperature, said lamp and said thermostatic means being in series circuit and being in parallel circuit with said temperature sensitive switch.

RALPH L. BENSON.
HARRIS D. SILVERS.

REFERENCES CITED

The following references are of record in the file of this patent:

UNITED STATES PATENTS

| Number | Name | Date |
|---|---|---|
| 2,133,959 | Buchanan | Oct. 25, 1938 |
| 2,133,966 | Buchanan | Oct. 25, 1938 |